United States Patent
Jang et al.

(10) Patent No.: US 11,296,362 B2
(45) Date of Patent: Apr. 5, 2022

(54) SERIAL-TO-PARALLEL CONVERTER AND BATTERY MODULE HAVING SAME

(71) Applicant: LG CHEM, LTD., Seoul (KR)

(72) Inventors: Jae-Young Jang, Daejeon (KR);
Jae-Kuk Kwon, Daejeon (KR);
Sang-Jin Kim, Daejeon (KR);
Young-Su Son, Daejeon (KR);
Young-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 208 days.

(21) Appl. No.: 16/609,857

(22) PCT Filed: Dec. 27, 2018

(86) PCT No.: PCT/KR2018/016795
§ 371 (c)(1),
(2) Date: Oct. 31, 2019

(87) PCT Pub. No.: WO2019/151657
PCT Pub. Date: Aug. 8, 2019

(65) Prior Publication Data
US 2020/0083569 A1    Mar. 12, 2020

(30) Foreign Application Priority Data

Jan. 30, 2018   (KR) .................. 10-2018-0011127

(51) Int. Cl.
*H01M 10/42*    (2006.01)
*H02J 7/00*    (2006.01)

(52) U.S. Cl.
CPC ..... *H01M 10/425* (2013.01); *H01M 10/4207* (2013.01); *H02J 7/0024* (2013.01); *H01M 2010/4271* (2013.01)

(58) Field of Classification Search
CPC .......... H01M 10/4207; H01M 10/425; H01M 50/502; H02J 7/0024; Y02E 60/10
See application file for complete search history.

(56) References Cited

U.S. PATENT DOCUMENTS

| 3,718,848 A | 2/1973 | Hines |
| 4,256,932 A | 3/1981 | Owen |

(Continued)

FOREIGN PATENT DOCUMENTS

| CN | 202178595 U | 3/2012 |
| CN | 102624052 A | 8/2012 |

(Continued)

OTHER PUBLICATIONS

Machine Translation CN105428581B (Year: 2017).*

(Continued)

*Primary Examiner* — Victoria H Lynch
(74) *Attorney, Agent, or Firm* — Birch, Stewart, Kolasch & Birch, LLP (57) ABSTRACT

Disclosed is a serial-to-parallel converting apparatus. The serial-to-parallel converting apparatus includes: an input plate connected to positive electrodes and negative electrodes of a plurality of battery cells, respectively: an output plate spaced apart from the input plate and connected to an external terminal; a rotary plate rotatably interposed between the input plate and the output plate to electrically connect the input plate and the output plate, the rotary plate being configured to convert serial connection and parallel connection of the plurality of battery cells by rotating; and a case configured to accommodate the input plate, the output plate and the rotary plate.

15 Claims, 11 Drawing Sheets

(56) References Cited

U.S. PATENT DOCUMENTS

| | | |
|---|---|---|
| 5,104,752 A | 4/1992 | Baughman et al. |
| 5,696,434 A | 12/1997 | Dennett |
| 5,923,008 A | 7/1999 | Williams, Jr. |
| 2014/0002002 A1 | 1/2014 | Barza et al. |
| 2014/0199570 A1 | 7/2014 | Cho |
| 2014/0356656 A1 | 12/2014 | Chen et al. |
| 2015/0129398 A1 | 5/2015 | Wilkins et al. |
| 2015/0214532 A1 | 7/2015 | Nakayama et al. |

FOREIGN PATENT DOCUMENTS

| | | | |
|---|---|---|---|
| CN | 103137935 A | 6/2013 | |
| CN | 105428581 A | 3/2016 | |
| CN | 106165047 A | 11/2016 | |
| CN | 106451845 A | 2/2017 | |
| CN | 106855329 A | 5/2017 | |
| CN | 105428581 B * | 11/2017 | ............ H01M 2/20 |
| EP | 0982830 A2 | 3/2000 | |
| EP | 1588632 A2 | 10/2005 | |
| EP | 2651001 A1 | 10/2013 | |
| JP | 50-32569 U | 4/1975 | |
| JP | 59-46428 U | 3/1984 | |
| JP | 63-152156 U | 10/1988 | |
| JP | 9-147826 A | 6/1997 | |
| JP | 9-283109 A | 10/1997 | |
| JP | 11-176303 A | 7/1999 | |
| JP | 2001-197605 A | 7/2001 | |
| JP | 2005-166493 A | 6/2005 | |
| JP | 2012-256728 A | 12/2012 | |
| JP | 2015-141867 A | 8/2015 | |
| JP | 2016-32374 A | 3/2016 | |
| KR | 10-2013-0133557 A | 12/2013 | |
| KR | 10-2014-0092656 A | 7/2014 | |
| KR | 10-2016-0088002 A | 7/2016 | |
| WO | WO 2015/070150 A2 | 5/2015 | |

OTHER PUBLICATIONS

Extended European Search Report for Application No. 18903306.1 dated Jun. 19, 2020.

International Search Report (PCT/ISA/210) issued in PCT/KR2018/016795, dated Apr. 12, 2019.

* cited by examiner

FIG. 11

SERIAL-TO-PARALLEL CONVERTER AND BATTERY MODULE HAVING SAME

TECHNICAL FIELD

The present application claims priority to Korean Patent Application No. 10-2018-0011127 filed on Jan. 30, 2018 in the Republic of Korea. the disclosures of which are incorporated herein by reference.

The present disclosure relates to a serial-to-parallel converting apparatus and a battery module including the serial-to-parallel converting apparatus, and more particularly, to a serial-to-parallel converting apparatus capable of simply converting a plurality of battery cells into various serial or parallel forms and a battery module including the serial-to-parallel converting apparatus.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode. and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

There is disclosed a technique of converting a connection relationship of a plurality of battery cells into a serial or parallel connection by using a conventional sliding-type serial-to-parallel switch. However, if the sliding-type serial-to-parallel switch is used, the connection of the battery cells is monotonous. Also, in order to switch battery cells connected complexly, it is needed to elongate the switch or the increase the number switches.

DISCLOSURE

Technical Problem

The present disclosure is to providing a serial-to-parallel converting apparatus, which may simply convert a plurality of battery cells into various serial or parallel forms, and a battery module including the serial-to-parallel converting apparatus.

Also, the present disclosure is to providing a serial-to-parallel converting apparatus, which may prevent the entire volume from increasing, and a battery module including the serial-to-parallel converting apparatus.

In addition, the present disclosure is to providing a serial-to-parallel converting apparatus, which may prevent wires connected to an input plate or an output plate from being twisted, and a battery module including the serial-to-parallel converting apparatus.

Technical Solution

In one aspect of the present disclosure, there is provided a serial-to-parallel converting apparatus, comprising: an input plate connected to positive electrodes and negative electrodes of a plurality of battery cells, respectively; an output plate spaced apart from the input plate and connected to an external terminal; a rotary plate rotatably interposed between the input plate and the output plate to electrically connect the input plate and the output plate, the rotary plate being configured to convert serial connection and parallel connection of the plurality of battery cells by rotating; and a case configured to accommodate the input plate, the output plate and the rotary plate.

Also, a first protrusion may be formed on the rotary plate to contact the input plate.

In addition, a second protrusion may be formed on the output plate to contact the rotary plate.

Also, the input plate, the rotary plate and the output plate may be stacked on each other, and the input plate may be fixed.

In addition, the output plate may be configured to be movable toward the input plate or away from the input plate.

Also, the output plate may be in contact with the rotary plate to move toward the input plate or away from the input plate together with the rotary plate.

In addition, a fixing protrusion or a fixing groove may be formed at the output plate and the case, respectively, and the fixing protrusion and the fixing groove may be coupled to restrict rotation of the output plate.

Also, the rotary plate may be connected to a rotary shaft configured to be rotatable, and a perforation hole may be formed in the output plate so that the rotary shaft is inserted therein.

In addition, a moving unit configured to move the rotary plate away from the input plate and an elastic member configured to move the rotary plate toward the input plate may be coupled to the rotary shaft, and an elastic member placing portion may be formed at the case so that the elastic member is placed thereon.

Also, the rotary shaft may include a rotating unit configured to rotate the rotary plate, and the rotating unit may include: first teeth provided at the case and having a first inclined portion so that one end thereof is inclined, the first teeth being spaced from each other at a predetermined interval; and second teeth coupled to the rotary shaft and having a second inclined portion formed corresponding to the first inclined portion of the first teeth, the second teeth being spaced from each other at a predetermined interval.

In addition, an insulation region may be formed in at least a portion of the rotary plate.

Also, the insulation region may be formed in a linear shape to pass through a center portion of the rotary plate.

In addition, the rotary plate may have a simultaneous connection region to which a positive electrode of one cell and a negative electrode of another cell are simultaneously connected by the rotation of the rotary plate.

Meanwhile, in another aspect of the present disclosure, there is also provided a battery module, comprising: the serial-to-parallel converting apparatus described above: a plurality of battery cells connected to the serial-to-parallel converting apparatus; and a battery management unit (BMU) electrically connected to the plurality of battery cells through the serial-to-parallel converting apparatus to control the battery cells.

Also, the rotary plate may have a simultaneous connection region to which a positive electrode of one cell and a negative electrode of another cell are simultaneously connected by the rotation of the rotary plate, and the battery management unit may be connected to the simultaneous connection region.

Advantageous Effects

According to embodiments of the present disclosure, a plurality of battery cells may be simply converted into various serial or parallel forms by using the input plate, the rotary plate and the output plate.

Also, since more complex serial-to-parallel conversion is available just by increasing the number of divided regions of the rotary plate as required while maintaining the entire area of the rotary plate, it is possible to prevent the entire volume from increasing.

In addition, since the input plate and the output plate are configured not to rotate, it is possible to prevent wires connected to the input plate or the output plate from being twisted.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 1:
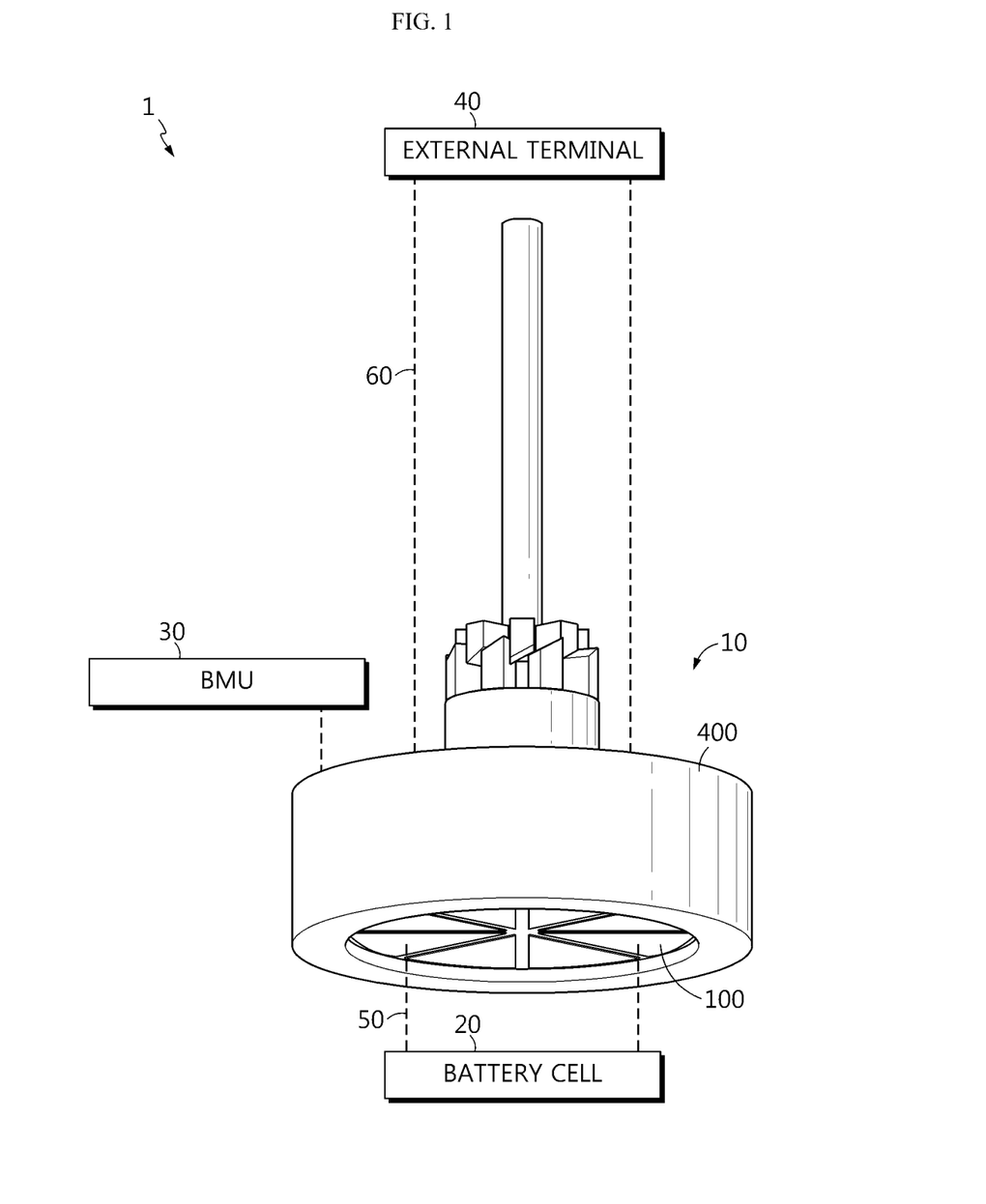
FIG. 1 is a schematic diagram showing a battery module including a serial-to-parallel converting apparatus according to an embodiment of the present disclosure.
Figure 2:
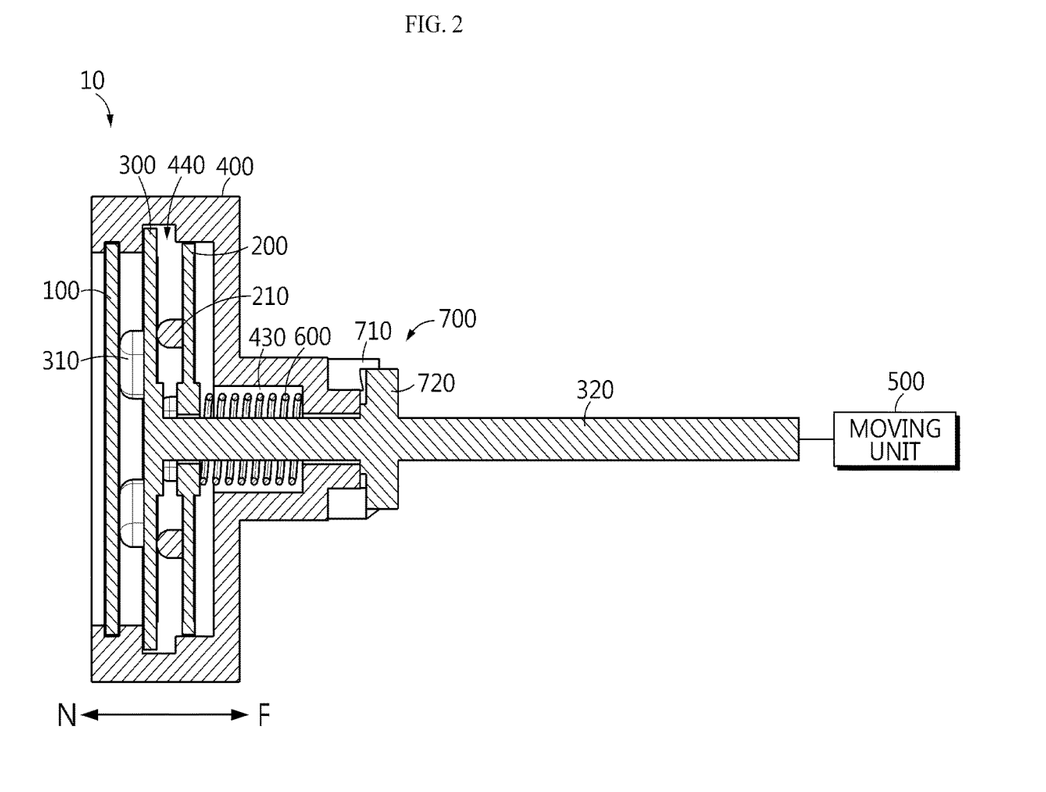
FIG. 2 is a cross-sectional view showing the serial-to-parallel converting apparatus according to an embodiment of the present disclosure.
Figure 3:
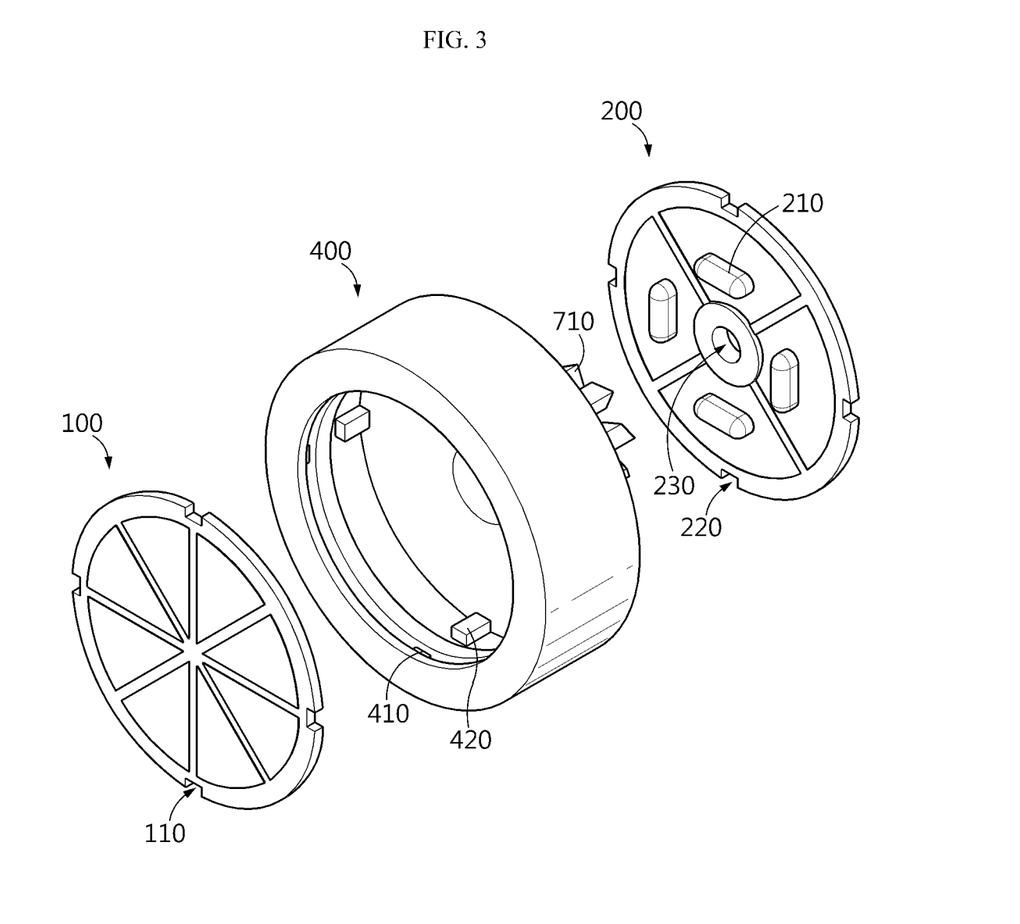
FIG. 3 is an exploded perspective view showing an input plate, an output plate and a case, employed at the serial-to-parallel converting apparatus according to an embodiment of the present disclosure.

FIG. 1 is a schematic diagram showing a battery module including a serial-to-parallel converting apparatus according to an embodiment of the present disclosure, FIG. 2 is a cross-sectional view showing the serial-to-parallel converting apparatus according to an embodiment of the present disclosure, and FIG. 3 is an exploded perspective view showing an input plate, an output plate and a case, employed at the serial-to-parallel converting apparatus according to an embodiment of the present disclosure.

Referring to FIGS. 1 to 3, a serial-to-parallel converting apparatus 10 according to an embodiment of the present disclosure includes an input plate 100, an output plate 200, a rotary plate 300, and a case 400.

The input plate 100 is connected to positive electrodes and negative electrodes of a plurality of battery cells 20, respectively. For example, the input plate 100 may have eight divided areas (see FIGS. 8(a) and 10(a)), and positive electrodes and negative electrode of four battery cells 20a, 20b, 20c, 20d are connected to the eight divided areas, respectively. That is, the input plate 100 having a circular shape is divided into eight equal areas, and the positive electrodes and the negative electrodes of four battery cells 20a, 20b, 20c, 20d are connected to the eight divided areas of the input plate 100, respectively. Here, it is just an example that four battery cells 20 are provided and the input plate 100 is divided into eight equal areas, and the number of battery cells 20 and the number of divided areas of the input plate 100 may be varied. In addition, if necessary, the divided areas of the input plate 100 may not be identical but be different from each other. However, for convenience of explanation, the following explanation will be based on the case where the input plate 100 is divided into eight equal areas and four battery cells 20 are provided.

The input plate 100 may be connected to the negative electrode and the positive electrode of the battery cell 20 in various ways, for example through a wire 50 made of conductive material (see FIG. 1). However, the connection method is not limited to the wire 50.

The input plate 100 is accommodated in the case 400 and may be fixed to the case 400 in various ways. For example, a fixing groove (not shown) may be formed in the case 400 and a fixing protrusion (not shown) may be formed on the input plate 100 so that the fixing groove (not shown) of the case 400 and the fixing protrusion (not shown) of the input plate 100 are coupled to fix the input plate 100 to the case 400. Alternatively, referring to FIG. 3, a first fixing protrusion 410 may be formed on the case 400 and a fixing groove 110 may be formed in the input plate 100 so that the first fixing protrusion 410 of the case 400 and the fixing groove 110 of the input plate 100 are coupled to fix the input plate 100 to the case 400. As explained later, the rotary plate 300 may move linearly or rotate toward the input plate 100 or away from the input plate 100. In addition, even though the output plate 200 is not rotatable, the output plate 200 may be in contact with the rotary plate 300 to move linearly toward the input plate 100 or away from the input plate 100 together with the rotary plate 300. However, the input plate 100 is completely fixed to the case 400 and thus is not able to move linearly or rotate.

The input plate 100, the rotary plate 300 and the output plate 200 may be stacked on each other. For example, referring to FIG. 2, the input plate 100 is disposed at a left side based on FIG. 2, the output plate 200 is disposed at a right side based on FIG. 2, and the rotary plate 300 is disposed between the input plate 100 and the output plate 200 in contact to be electrically connected with each other. As explained later, when converting the serial connection or the parallel connection of the battery cells 20, the rotary plate 300 moves away from the input plate 100 and rotates to contact the input plate 100 again. This will be explained later.

The output plate 200 is spaced apart from the input plate 100. Here, the voltage of the battery cell 20 is outputted through the input plate 100, the rotary plate 300 and the output plate 200 electrically connected to the battery cell 20, and the output voltage may be is connected outputted to an external terminal 40 of various electronic devices, electronic equipment, or vehicles and supplied to the various electronic devices, electronic equipment, or vehicles.

The output plate 200 may be connected to the external terminal 40 in various ways, for example via a wire 60 made of conductive material (see FIG. 1). However, the connection method is not limited to the wire 60.

The output plate 200 is accommodated in the case 400 and may be fixed to the case 400 in various ways. For example, a fixing groove (not shown) may formed in the case 400 and a fixing protrusion (not shown) is formed on the output plate 200 so that the fixing groove (not shown) of the case 400 and the fixing protrusion (not shown) of the output plate 200 are coupled to fix the output plate 200 to the case 400. Alternatively, referring to FIG. 3, a second fixing protrusion 420 may be formed on the case 400 and a fixing groove 220 is formed in the output plate 200 so that the second fixing protrusion 420 of the case 400 and the fixing groove 220 of the output plate 200 are coupled to fix the output plate 200 to the case 400. In this way, the output plate 200 is fixed to the case 400 and restricted not to rotate in the rotation direction of the rotary plate 300. However, the output plate 200 may move linearly along the second fixing protrusion 420 due to the fixing groove 220. That is, referring to FIG. 2, the output plate 200 may move linearly in a lateral direction based on FIG. 2. namely in an arrow direction N or an arrow direction F, but is not able to rotate. Since both the input plate 100 and the output plate 200 are fixed to the case 400 not to rotate, the wire 50 connecting the input plate 100 and the battery cell 20 and the wire 60 connecting the output plate 200 and the external terminal 40 are not twisted, thereby stabilizing the electrical connection between the input plate 100 and the battery cell 20 and the electrical connection between the output plate 200 and the external terminal 40. That is, for example, if the input plate 100 is configured to rotate, the plurality of wires 50 connecting the input plate 100 and the battery cell 20 may be twisted with each other to make the electrical connection unstable. Also, if the number of rotations of the input plate 100 increases, the input plate 100 may not rotate further due to the tension of the twisted wires 50. In addition, this problem also occurs when the output plate 200 is configured to rotate. However, in the serial-to-parallel converting apparatus 10 according to an embodiment of the present disclosure, the input plate 100 and the output plate 200 are configured not to rotate, and only the rotary plate 300 rotates between the input plate 100 and the output plate 200, thereby solving the above problems, namely various problems caused by twisting of the wires 50 and 60 connected to the input plate 100 or the output plate 200.

A second protrusion 210 may be formed on the output plate 200 to contact the rotary plate 300. That is, since the output plate 200 and the rotary plate 300 are electrically connected through the second protrusion 210, the second protrusion 210 functions as a contact point. The second protrusion 210 may have provided in various numbers and various shapes, and the second protrusion 210 may be integrally formed with the output plate 200 or be coupled to the output plate 200 by welding or the like.

The output plate 200 may be configured to move toward the input plate 100, namely in a direction N of FIG. 2, and away from the input plate 100, namely in a direction F of FIG. 2. At this time, the second protrusion 210 of the output plate 200 may contact the rotary plate 300 to move together with the rotary plate 300 toward the input plate 100 or away from the input plate 100. As explained later, if the rotary plate 300 moves away from the input plate 100, the second protrusion 210 and the output plate 200, which are in contact with the rotary plate 300, also move away from the input plate 100 together with the rotary plate 300. In addition, if an elastic restoring force of the elastic member 600 is applied, the output plate 200 and the rotary plate 300 may move toward the input plate 100. At this time, since the rotary plate 300 is able to rotate by the rotating unit 700 and the output plate 200 is not able to rotate as described above, the rotary plate 300 rotates while contacting the second protrusion 210. Here, in order to reduce the contact friction between the rotary plate 300 and the second protrusion 210, a curved surface having a rounded shape may be formed at an end of the second protrusion 210, which is in contact with the rotary plate 300.

As shown in FIG. 2, the rotary plate 300 may be rotatably disposed between the input plate 100 and the output plate 200 to be electrically connected to the input plate 100 and the output plate 200. In addition, the rotary plate 300 may be rotated to convert a serial connection and a parallel connection of the plurality of battery cells 20. Here, a first protrusion 310 capable of contacting the input plate 100 may be formed on the rotary plate 300. That is, since the rotary plate 300 and the input plate 100 are electrically connected through the first protrusion 310, the first protrusion 310 functions as a contact point. The first protrusion 310 may have various numbers and various shapes, and may be integrally formed with the rotary plate 300 or be coupled to the rotary plate 300 by welding or the like.

The rotary plate 300 may be configured to move toward the input plate 100, namely in the direction N of FIG. 2, or away from the input plate 100, namely in the direction F of FIG. 2. For example. referring to FIG. 2, the rotary plate 300 may be connected to a rotatable rotary shaft 320, which is configured to be rotatable, and the rotary plate 300 is also rotated by the rotation of the rotary shaft 320. At this time, a perforation hole 230 (see FIG. 3) may be formed in the output plate 200 so that the rotary shaft 320 is inserted therein. The rotary shaft 320 may be rotated in various ways. For example, a power source such as a motor may be coupled to the rotary shaft 320 to rotate the rotary shaft 320. Alternatively, the rotary shaft 320 may include a rotating unit 700 capable of rotating the rotary plate 300.

FIGS. 4 to 7 are diagrams for illustrating a process in which a rotary shaft is rotated by a rotating unit, employed at the serial-to-parallel converting apparatus according to an embodiment of the present disclosure.

Figure 4:
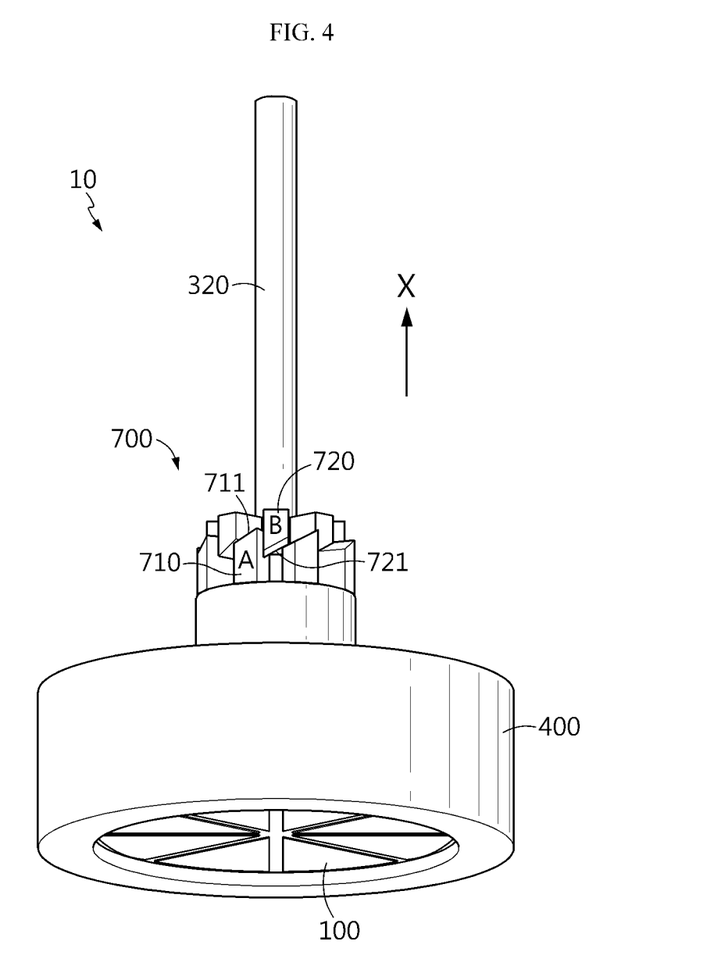
FIGS. 4 to 7 are diagrams for illustrating a process in which a rotary shaft is rotated by a rotating unit, employed at the serial-to-parallel converting apparatus according to an embodiment of the present disclosure.
Figure 5:
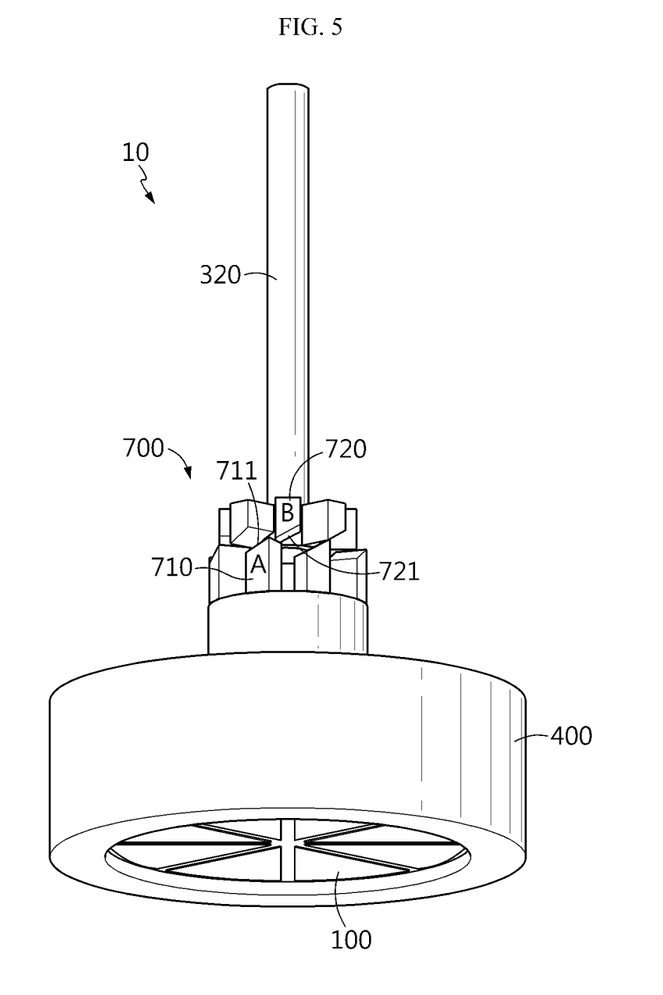
Figure 6:
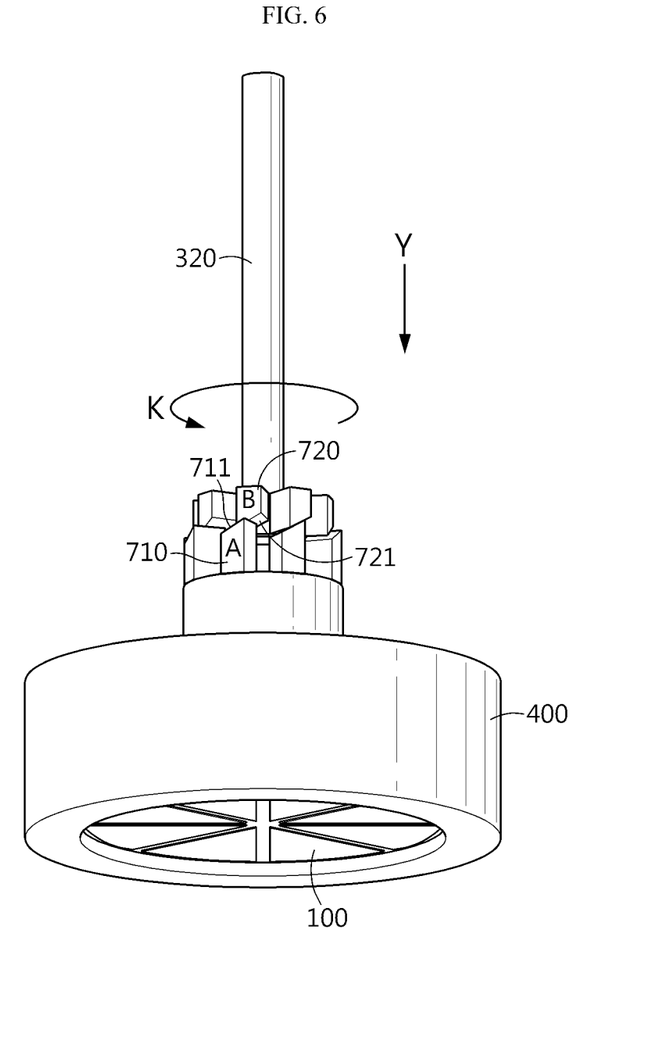
Figure 7:
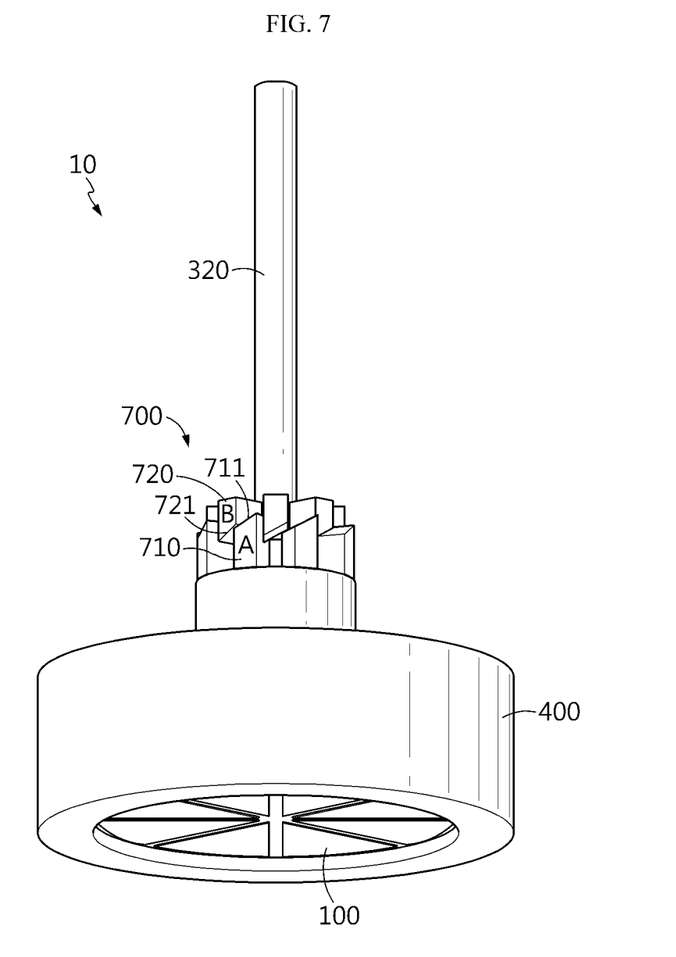

Referring to FIGS. 4 to 7, the rotating unit 700 may include first teeth 710 and second teeth 720. The first teeth 710 may be provided at the case 400 and may have a first inclined portion 711 so one end of the first teeth 710 is inclined. Here, the first teeth 710 are spaced apart from each other at predetermined intervals. The predetermined intervals of the first teeth 710 are preferably equal to each other, without being limited thereto. The second teeth 720 may be coupled to the rotary shaft 320 and have a second inclined portion 721 corresponding to the first inclined portion 711 of the first teeth 710. The second teeth 720 are spaced apart from each other by predetermined intervals. The predetermined intervals of the second teeth 720 are preferably equal to each other, similar to the predetermined intervals of the first teeth 710, without being limited thereto. Now, the process in which the rotary shaft 320 rotates by the first teeth 710 and second teeth 720 of the rotating unit 700 will be described. Referring to FIG. 4, any one of the second teeth 720 marked by B is located at a right of any one of the first teeth 710 marked by A, based on FIG. 4. In addition, in FIG. 4, if the rotary shaft 320 is moved away from the input plate 100, for example, by a solenoid, namely in a direction X of FIG. 4, the first tooth 710 marked by A and the second tooth 720 marked by B are located as shown in FIG. 5. However, the means for moving the rotary shaft 320 is not necessarily limited to the solenoid, and the rotary shaft 320 may be moved away from the input plate 100 by various power sources such as a step motor. In addition, if the first tooth 710 marked by A and the second tooth 720 marked by B are located as shown in FIG. 5, the solenoid stops operating and the rotary shaft 320 moves toward the input plate 100, namely in a direction Y of FIG. 6, due to, for example, the elastic restoring force of the elastic member 600. At this time, as the second inclined portion 721 of the second tooth 720 marked by B moves in in the direction Y along the first inclined portion 711 of the first tooth 710 marked by A, the rotary shaft 320 rotates in an arrow direction K of FIG. 6, and thus, as shown in FIG. 7, the second tooth 720 marked by B is located at a left side of the first tooth 710 marked by A, based on FIG. 7. In this way, the rotary shaft 320 may be rotated by a predetermined angle, and the rotary plate 300 coupled to the rotary shaft 320 may also be rotated. That is, the rotary plate 300 moves away from the input plate 100 and rotates in a state where the first protrusion 310 is separated from the input plate 100, namely in a state where the rotary plate 300 and the input plate 100 are not in contact with each other. The rotary plate 300 may be rotated by a motor or the like, or may be rotated by the rotating unit 700 described above. If the rotary plate 300 is configured to rotate by a motor or the like, the rotary plate 300 may be configured to rotate in a state of being spaced apart from the input plate 100. Also, if the rotary plate 300 is completely rotated, the rotary plate 300 may move toward the input plate 100 to contact the input plate 100. In addition, if the rotary plate 300 is configured to rotate by the rotating unit 700, namely by the first teeth 710 and the second teeth 720, the rotary plate 300 may be configured to move away from the input plate 100 and then rotate together with moving toward the input plate 100.

The rotary plate 300 may be moved away from the input plate 100, for example in the direction F of FIG. 2, or toward the input plate 100, for example in the direction N of FIG. 2. In order to move the rotary plate 300, a moving unit 500 and an elastic member 600 for moving the rotary shaft 320 coupled to the rotary plate 300 may be provided. The moving unit 500 is coupled to the rotary shaft 320 to move the rotary plate 300 away from the input plate 100. The moving unit 500 may include, for example, a solenoid, or may include various power sources such as a motor without being limited thereto. The elastic member 600 is coupled to the rotary shaft 320 to move the rotary plate 300 toward the input plate 100. For this purpose, the case 400 may have an elastic member placing portion 430 formed so that the elastic member 600 is placed thereon. Referring to FIG. 2, if the rotary shaft 320 is moved in the direction F by the moving unit 500, not only the rotary plate 300 coupled to the rotary shaft 320 but also the output plate 200 in contact with the rotary plate 300 move together in the direction F. Here, the elastic member 600 is contracted by the output plate 200. In addition, if the operation of the moving unit 500 is stopped, the output plate 200 moves in the direction N due to the elastic restoring force of the elastic member 600, and the rotary plate 300 in contact with the output plate 200 also moves in the direction N. In addition, as described above, the rotary plate 300 rotates by a predetermined angle by the rotating unit 700 while moving in the direction N. Here, the elastic member 600 includes various materials with elasticity and may be, for example, a coil spring.

Figure 8:
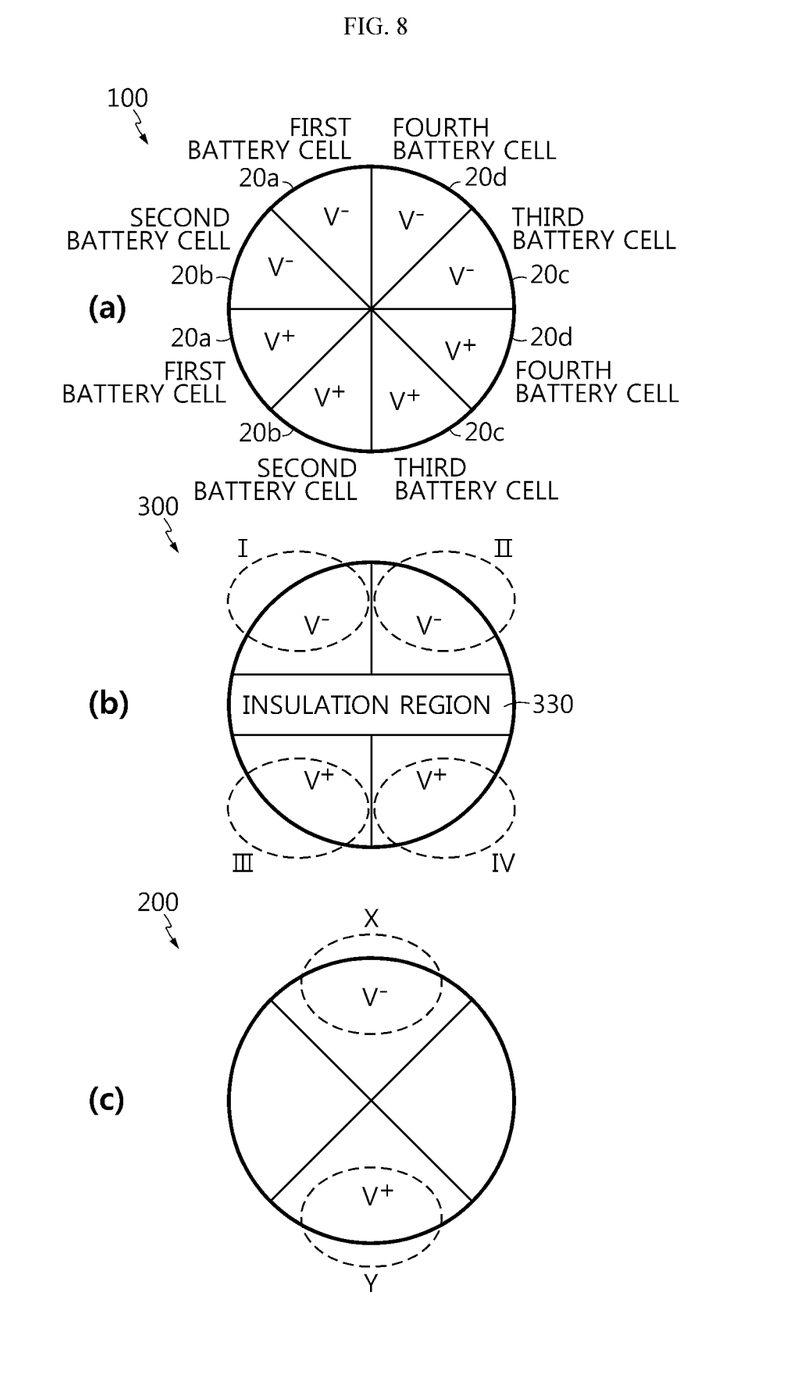
FIGS. 8(a) to 8(c) are diagrams schematically showing the input plate, the rotary plate and the output plate for serial or parallel connection according to an example of the serial-to-parallel converting apparatus according to an embodiment of the present disclosure.

An insulation region 330 may be formed in at least a portion of the rotary plate 300 (see FIGS. 8(*b*) and 10(*b*)). Here, the insulation region 330 may have a linear shape to pass through a center portion of the rotary plate 300. Due to the insulation region 330, it is possible to prevent a short even though the rotary plate 300 rotates in contact with the output plate 200 and contacts the input plate 100. However, the shape and position of the insulation region 330 may vary as needed.

Figure 10:
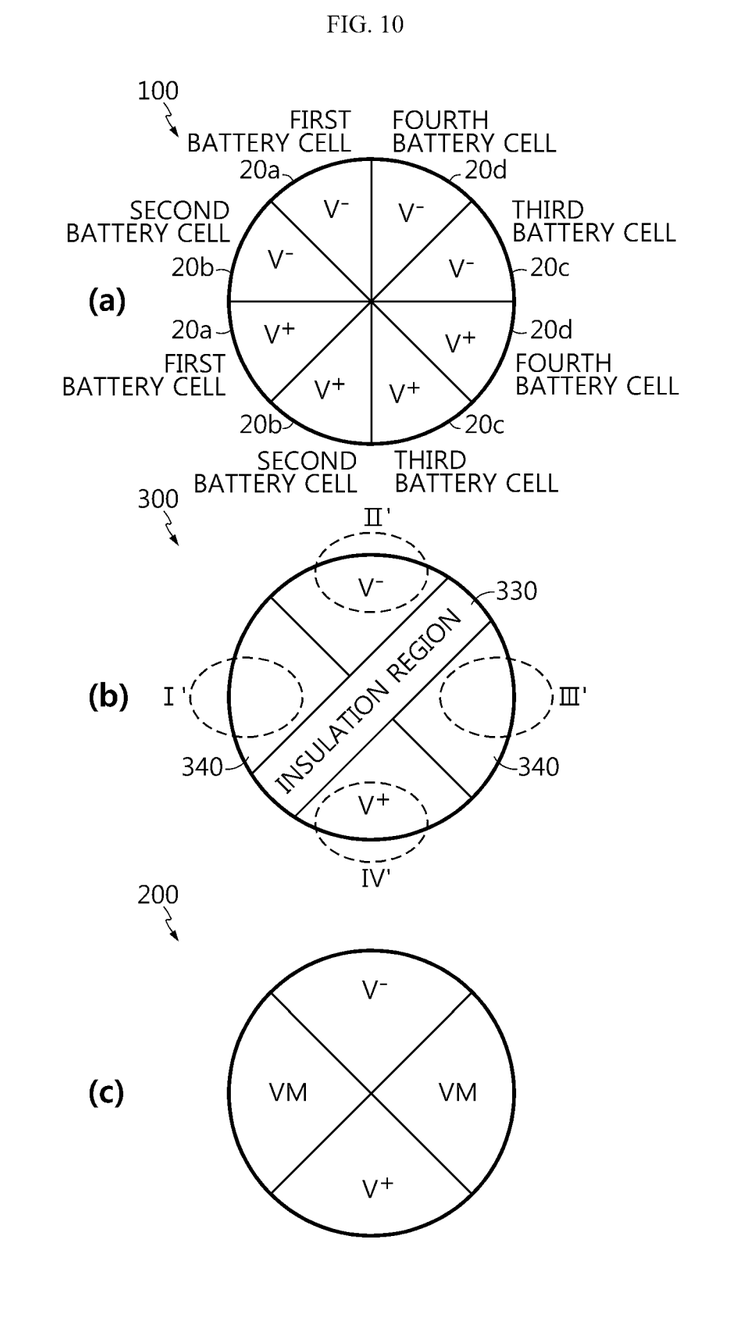
FIGS. 10(a) to 10(c) are diagrams schematically showing the input plate, the rotary plate and the output plate for serial or parallel connection according to another example of the serial-to-parallel converting apparatus according to an embodiment of the present disclosure.

The rotary plate 300 may include a simultaneous connection region 340 to which a positive electrode of one cell and a negative electrode of another cell are simultaneously connected by rotation of the rotary plate 300 (see FIG. 10(*b*)). For example, a region 1″, which is one of the simultaneous connection regions 340 in FIG. 10(*b*), is connected to a positive electrode of a first battery cell 20*a* and a negative electrode of a second battery cell 20*b*, and a region III', which is another simultaneous connection region 340, is connected to a negative electrode of a third battery cell 20*c* and a positive electrode of a fourth battery cell 20*d*. A battery management unit (BMU) 30 may be connected to the simultaneous connection region 340. This will be explained later.

The case 400 accommodates the input plate 100, the output plate 200 and the rotary plate 300. The case 400 may have a fixing groove (not shown) or the first fixing protrusion 410 formed to fix the input plate 100, and may also have a fixing groove (not shown) or the second fixing protrusion 420 formed to fix the output plate 200. In addition, the case 400 may have a driving groove 440 (see FIG. 2) formed so that the rotary plate 300 may be rotated and moved. That is, the rotary plate 300 may rotate inside the driving groove 440 formed in the case 400 and also move in the direction N and the direction F of FIG. 2.

Hereinafter, the operation and effect of the serial-to-parallel converting apparatus 10 according to an embodiment of the present disclosure will be described with reference to the drawings.

Referring to FIGS. 1 and 2, the input plate 100, the rotary plate 300 and the output plate 200 may be stacked in order in the case 400. Here, the input plate 100, the output plate 200 and the rotary plate 300 may have a circular shape. The input plate 100 is fixed to the case 400. In addition, the rotary plate 300 may be moved away from the input plate 100 or moved to contact the input plate 100, and may be rotated in a state of being spaced apart from the input plate 100. In addition, the output plate 200 is coupled to the case 400 not to rotate, but the output plate 200 may be in contact with the rotary plate 300 to be moved away from the input plate 100 or toward the input plate 100 together with the rotary plate 300. If the rotary plate 300 rotates in a state of being spaced apart from the input plate 100 and then contacts the input plate 100, the electrical connection state of the plurality of battery cells 20 is converted. The conversion of the electrical connection state of the plurality of battery cells 20 will be described below with reference to the drawings.

Figure 9:
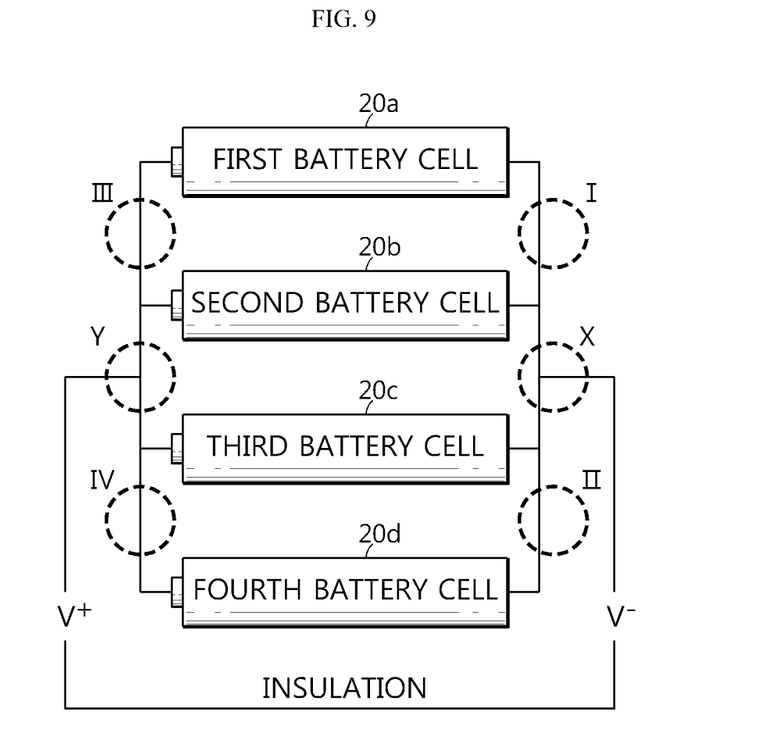
FIG. 9 is a diagram showing that battery cells are connected in serial or in parallel by FIG. 8.
Figure 11:
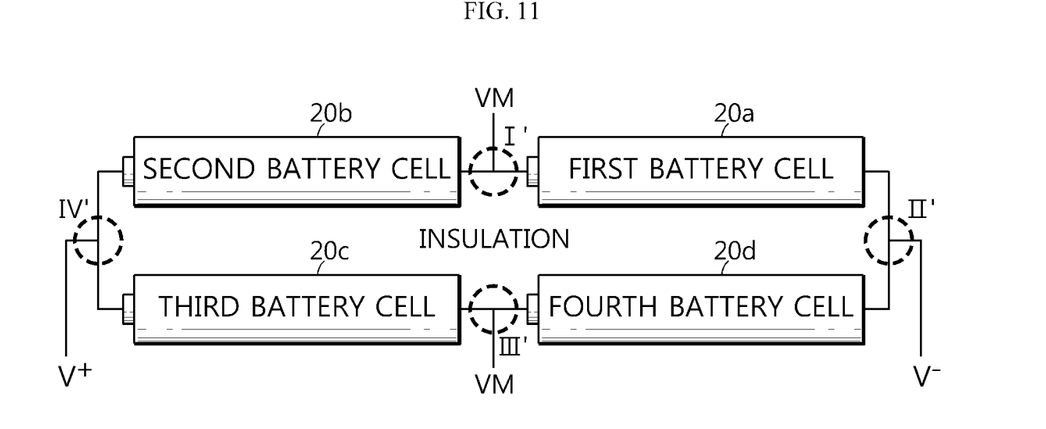
FIG. 11 is a diagram showing that battery cells are connected in serial or in parallel by FIG. 10.

FIGS. 8(a) to 8(c) are diagrams schematically showing the input plate, the rotary plate and the output plate for serial or parallel connection according to an example of the serial-to-parallel converting apparatus according to an embodiment of the present disclosure, FIG. 9 is a diagram showing that battery cells are connected in serial or in parallel by FIG. 8, FIGS. 10(a) to 10(c) are diagrams schematically showing the input plate, the rotary plate and the output plate for serial or parallel connection according to another example of the serial-to-parallel converting apparatus according to an embodiment of the present disclosure, and FIG. 11 is a diagram showing that battery cells are connected in serial or in parallel by FIG. 10.

In FIGS. 8(a) to 8(c), the input plate 100, the rotary plate 300 and and the output plate 200 are shown on a single plane.

Referring to FIGS. 8(a) to 8(c), the input plate 100 may have eight divided areas, and positive electrodes and negative electrodes of four battery cells 20a, 20b, 20c, 20d are connected to each of eight divided areas. In addition, the rotary plate 300 is connected to the negative electrode of the first battery cell 20a and the negative electrode of the second battery cell 20b in the region 1, which corresponds to the region I of FIG. 9. Also, the rotary plate 300 is connected to the negative electrode of the third battery cell 20c and the negative electrode of the fourth battery cell 20d in the region II, which corresponds to the region II of FIG. 9. In addition, the rotary plate 300 is connected to the positive electrode of the first battery cell 20a and the positive electrode of the second battery cell 20b in the region III, which corresponds to the region III of FIG. 9. Also, the rotary plate 300 is connected to the positive electrode of the third battery cell 20c and the positive electrode of the fourth battery cell 20d in the region IV, which corresponds to the region IV of FIG. 9. Meanwhile, the output plate 200 does not rotate, but the connection state of the output of the output plate 200 is changed by rotation of the rotary plate 300. That is, a negative electrode of the external terminal 40 is connected to the region X of the output plate 200, and a positive electrode of the external terminal 40 is connected to the region Y of the output plate 200. This corresponds to X and Y of FIG. 9. If the rotary plate 300 rotates to be positioned as in FIG. 8(b). the four battery cells 20a, 20b, 20c, 20d are connected in parallel as in FIG. 9.

In addition, the case where the rotary plate 300 rotates to be positioned as in FIG. 10(b) will be described. In FIGS. 10(a) to 10(c), the input plate 100, the rotary plate 300 and the output plate 200 are shown on a single plane, similar to FIGS. 8(a) to 8(c).

Referring to FIGS. 10(a) to 10(c), the input plate 100 may have eight divided areas, identical to FIG. 8(a), and positive electrodes and negative electrodes of four battery cells 20a, 20b, 20c, 20d are connected to each of the eight divided areas. In addition, the rotary plate 300 is connected to the positive electrode of the first battery cell 20a and the negative electrode of the second battery cell 20b in the region I', which corresponds to the region I' of FIG. 11. In FIG. 10(b), the region I' of the rotary plate 300 is connected to the VM of the output plate 200 and corresponds to the simultaneous connection region 340. Also, the battery management unit 30 is connected to the region I' through the output plate 200. In addition, the rotary plate 300 is connected to the negative electrode of the first battery cell 20a and the negative electrode of the fourth battery cell 20d in the region IF, which corresponds to the region of FIG. 11. Also, the rotary plate 300 is connected to the negative electrode of the third battery cell 20c and the positive electrode of the fourth battery cell 20d in the region III', which corresponds to the region III' of FIG. 11. In FIG. 10(b), the region III' of the rotary plate 300 is connected to the VM of the output plate 200 and corresponds to the simultaneous connection region 340. Also, the battery management unit 30 is connected to the region III' through the output plate 200. In addition, the rotary plate 300 is connected to the positive electrode of the second battery cell 20b and the positive electrode of the third battery cell 20c in the region IV', which corresponds to the region IV' of FIG. 11. Meanwhile, the output plate 200 does not rotate, but the connection state of the output of the output plate 200 is changed by rotation of the rotary plate 300. In the connection of FIGS. 10(c) and 11, the polarity of the rotary plate 300 and the polarity of the output plate 200 are the same. If the rotary plate 300 rotates to be located at the same position as FIG. 10(b), as in FIG. 11, the first battery cell 20a and the second battery cell 20b are connected in series, the third battery cell 20c and the fourth battery cell 20d are also connected in series, and the first battery cell 20a and the second battery cell 20b connected in series and the third battery cell 20c and the fourth battery cell 20d connected in series are connected in parallel. In this manner, the serial and parallel connection of the battery cell 20 may be converted in various ways by the rotation of the rotary plate 300. Here, even though the input plate 100 has eight divided areas and is connected to four battery cells 20a, 20b, 20c, 20d, the serial-to-parallel connection may be converted more variously by changing the number of divided areas of the input plate 100 and the number of the battery cells 20. Meanwhile, since both the input plate 100 and the output plate 200 are not able to rotate, the wire 50 connecting the input plate 100 and the battery cell 20 and the wire 60 connecting the output plate 200 and the external terminal 40 maintain their initial positions, thereby preventing the wires 50, 60 from being twisted.

Hereinafter, a battery module 1 including the serial-to-parallel converting apparatus according to an embodiment of the present disclosure will be described with reference to the drawings.

Referring to FIG. 1, the battery module 1 according to an embodiment of the present disclosure includes a serial-toparallel converting apparatus 10, a plurality of battery cells 20, and a battery management unit 30.

The serial-to-parallel converting apparatus 10 is described above.

The battery cell 20 may have various types such as cylindrical type, rectangular type and pouch type. In this embodiment, a plurality of battery cells 20 are provided, and the plurality of battery cells 20 are connected to the serial-to-parallel converting apparatus 10. In addition, each battery cell 20 may include an electrode lead. The electrode lead provided at the battery cell 20 is a kind of terminal that is exposed to the outside and connected to an external device, and may be made of a conductive material. The electrode lead may include a positive electrode lead and a negative electrode lead. The positive electrode lead and the negative electrode lead may be disposed at opposite sides in the longitudinal direction of the battery cell 20, or the positive electrode lead and the negative electrode lead may be positioned at the same side in the longitudinal direction of the battery cell 20. The electrode lead of the battery cell 20 may be connected to the input plate 100 through the wire 50. The battery cell 20 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery management unit 30 is electrically connected to the plurality of battery cells 20 via the serial-to-parallel converting apparatus 10 to control the battery cells 20. For example, the battery management unit 30 may include a protection circuit that controls the operation of the battery cells 20. Alternatively, the battery management unit 30 may be connected to the battery cells 20 to control charging or discharging of the battery cells 20 and sense temperature or the like of the battery cells 20. Here, the serial-to-parallel converting apparatus 10 to which the battery management unit 30 is connected includes a rotary plate 300. The rotary plate 300 may have a simultaneous connection region 340 to which a positive electrode of one cell and a negative electrode of another cell are simultaneously connected by the rotation of the rotary plate 300. The battery management unit 30 may be connected to the simultaneous connection region 340. Namely, the battery management unit 30 may be connected to the simultaneous connection region 340 to control temperature or the like of the battery cells 20, control charging or discharging of the battery cells 20, or control the protection circuit that protects the battery cells 20.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a serial-to-parallel converting apparatus and a battery module including the serial-to-parallel converting apparatus, and is particularly applicable to an industry related to a secondary battery.

What is claimed is:

1. A serial-to-parallel converting apparatus, comprising:
an input plate connected to positive electrodes and negative electrodes of a plurality of battery cells, respectively;
an output plate spaced apart from the input plate and connected to an external terminal;
a rotary plate rotatably interposed between the input plate and the output plate to electrically connect the input plate and the output plate, the rotary plate being configured to convert serial connection and parallel connection of the plurality of battery cells by rotating; and
a case configured to accommodate the input plate, the output plate and the rotary plate,
wherein the input plate includes a plurality of divided areas connected to the positive electrodes and the negative electrodes of the plurality of battery cells by at least one wire.

2. The serial-to-parallel converting apparatus according to claim 1, wherein a first protrusion is formed on the rotary plate to contact the input plate.

3. The serial-to-parallel converting apparatus according to claim 2, wherein a second protrusion is formed on the output plate to contact the rotary plate.

4. The serial-to-parallel converting apparatus according to claim 1, wherein the input plate, the rotary plate and the output plate are stacked on each other, and the input plate is fixed from rotation.

5. The serial-to-parallel converting apparatus according to claim 4, wherein the output plate is configured to be movable toward the input plate or away from the input plate.

6. The serial-to-parallel converting apparatus according to claim 5, wherein the output plate is in contact with the rotary plate to move toward the input plate or away from the input plate together with the rotary plate.

7. The serial-to-parallel converting apparatus according to claim 6, wherein a fixing protrusion or a fixing groove is formed at the output plate and the case, respectively, and the fixing protrusion and the fixing groove are coupled to restrict rotation of the output plate.

8. The serial-to-parallel converting apparatus according to claim 1, wherein the rotary plate is connected to a rotary shaft configured to be rotatable, and a perforation hole is formed in the output plate so that the rotary shaft is inserted therein.

9. The serial-to-parallel converting apparatus according to claim 8, wherein a moving unit configured to move the rotary plate away from the input plate and an elastic member configured to move the rotary plate toward the input plate are coupled to the rotary shaft, and
wherein an elastic member placing portion is formed at the case so that the elastic member is placed thereon.

10. The serial-to-parallel converting apparatus according to claim 9, wherein the rotary shaft includes a rotating unit configured to rotate the rotary plate, and
wherein the rotating unit includes:
first teeth provided at the case and having a first inclined portion so that one end thereof is inclined, the first teeth being spaced from each other at a predetermined interval; and
second teeth coupled to the rotary shaft and having a second inclined portion formed corresponding to the first inclined portion of the first teeth, the second teeth being spaced from each other at a predetermined interval.

11. A serial-to-parallel converting apparatus, comprising:
an input plate connected to positive electrodes and negative electrodes of a plurality of battery cells, respectively;

an output plate spaced apart from the input plate and connected to an external terminal;

a rotary plate rotatably interposed between the input plate and the output plate to electrically connect the input plate and the output plate, the rotary plate being configured to convert serial connection and parallel connection of the plurality of battery cells by rotating; and a case configured to accommodate the input plate, the output plate and the rotary plate, wherein an insulation region is formed in at least a portion of the rotary plate.

12. The serial-to-parallel converting apparatus according to claim 11, wherein the insulation region is formed in a linear shape to pass through a center portion of the rotary plate.

13. A serial-to-parallel converting apparatus, comprising:

an input plate connected to positive electrodes and negative electrodes of a plurality of battery cells, respectively;

an output plate spaced apart from the input plate and connected to an external terminal;

a rotary plate rotatably interposed between the input plate and the output plate to electrically connect the input plate and the output plate, the rotary plate being configured to convert serial connection and parallel connection of the plurality of battery cells by rotating; and a case configured to accommodate the input plate, the output plate and the rotary plate, wherein the rotary plate has a simultaneous connection region to which a positive electrode of one cell and a negative electrode of another cell are simultaneously connected by the rotation of the rotary plate.

14. A battery module, comprising:

a serial-to-parallel converting apparatus, comprising:

an input plate connected to positive electrodes and negative electrodes of a plurality of battery cells, respectively;

an output plate spaced apart from the input plate and connected to an external terminal;

a rotary plate rotatably interposed between the input plate and the output plate to electrically connect the input plate and the output plate, the rotary plate being configured to convert serial connection and parallel connection of the plurality of battery cells by rotating; and a case configured to accommodate the input plate, the output plate and the rotary plate;

the plurality of battery cells connected to the serial-to-parallel converting apparatus; and a battery management unit (BMU) electrically connected to the plurality of battery cells through the serial-to-parallel converting apparatus to control the plurality of battery cells.

15. The battery module according to claim 14, wherein the rotary plate has a simultaneous connection region to which a positive electrode of one cell and a negative electrode of another cell are simultaneously connected by the rotation of the rotary plate, and wherein a battery management unit (BMU) is connected to the simultaneous connection region.

* * * * *